United States Patent Office 3,520,243
Patented July 14, 1970

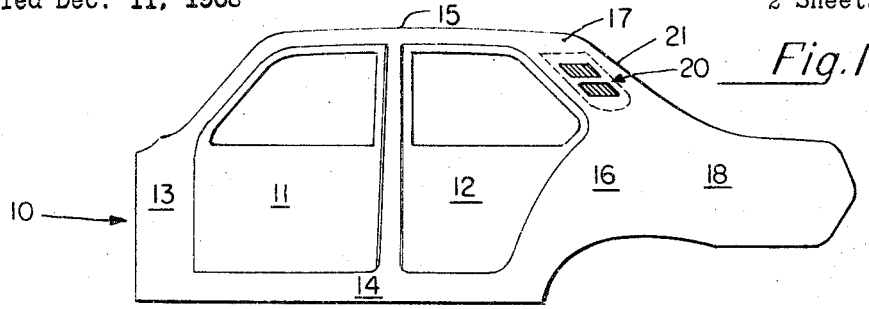
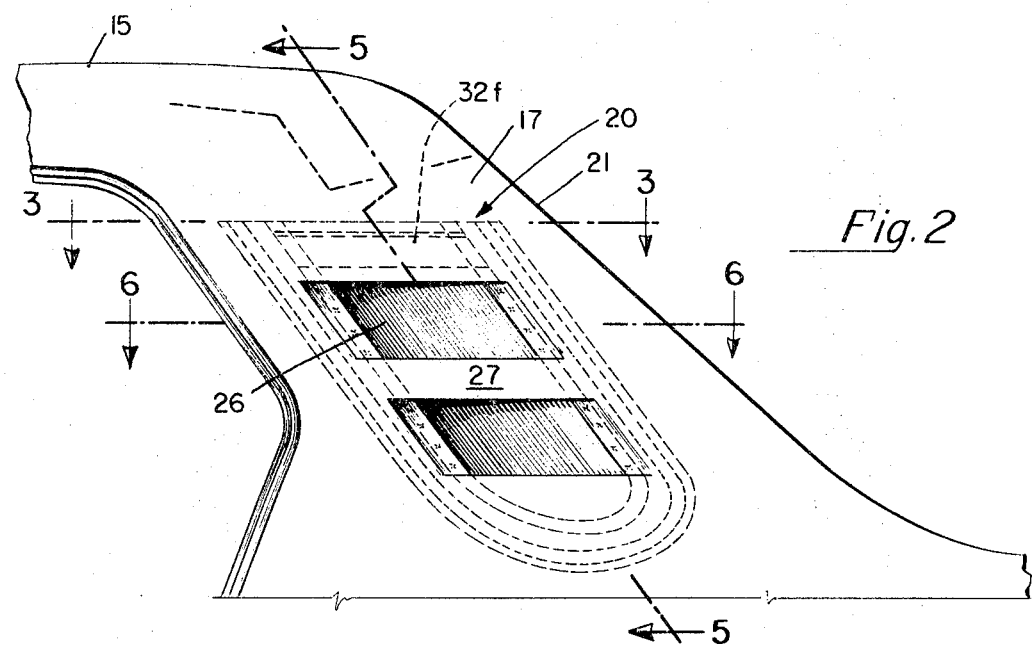
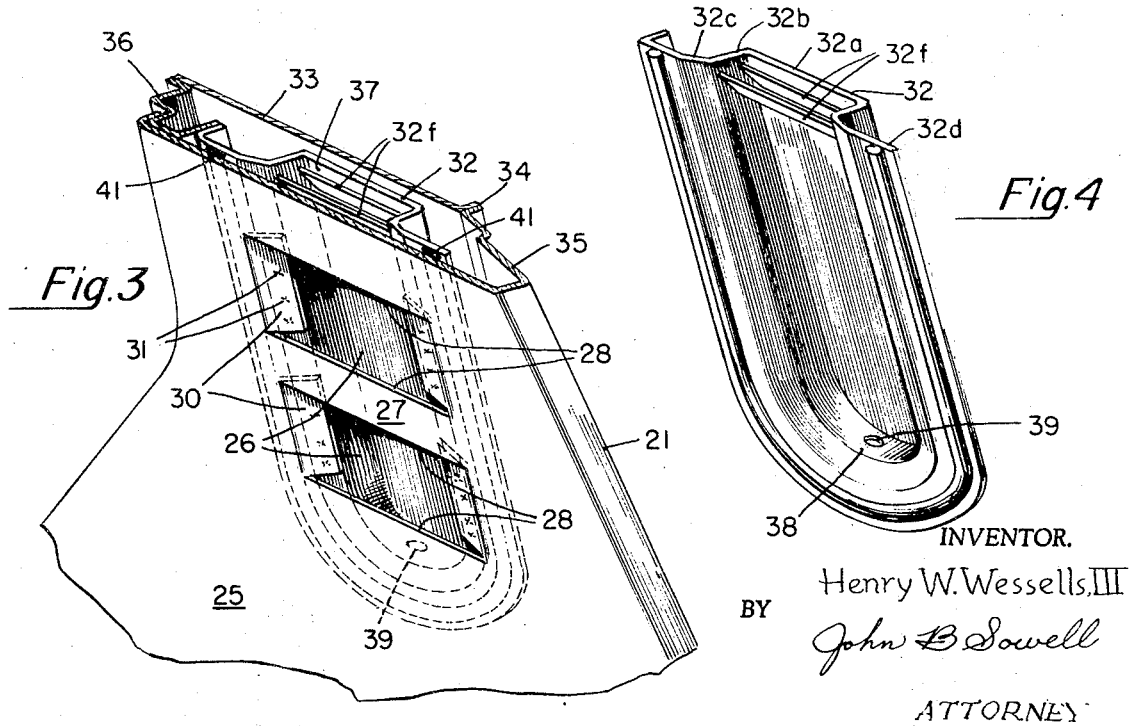

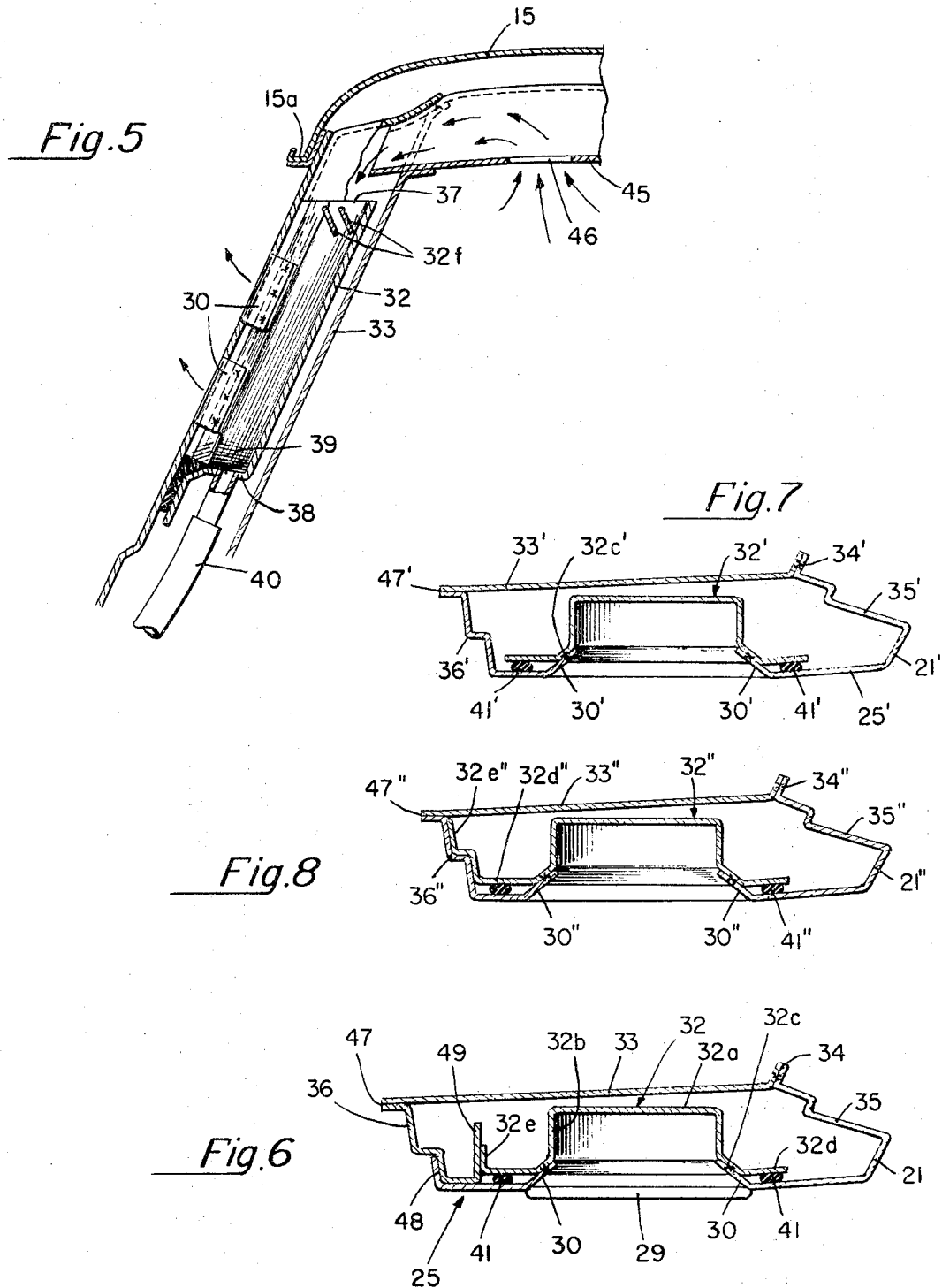

3,520,243
VEHICLE BODY AIR VENT
Henry W. Wessells III, Paoli, Pa., assignor to The Budd Company, Philadelphia, Pa., a corporation of Pennsylvania
Filed Dec. 11, 1968, Ser. No. 783,086
Int. Cl. B60h 1/26
U.S. Cl. 98—2                                      6 Claims

ABSTRACT OF THE DISCLOSURE

This application discloses an air vent construction for automotive vehicles in which air outlets are provided on each side of the body near the rear and toward the top in what is called the ear muff region and which includes baffle means to exclude the entry of water to the interior from the air outlet openings, together with means for draining out such water as may be entrapped by the baffle of the vent.

BACKGROUND OF INVENTION

This invention relates to a flow-through air ventilation system for pasenger vehicle bodies in which air is drawn into the body, usually at the front, as by car travel ram action or by blowers, and forced rearwardly and discharged, at least in part, toward the rear.

Specifically, the invention relates to structural arrangements for venting air at the rear which will prevent entry of water from the outside to the interior and which will entrap and dispose of such water as may enter openings provided in the outside panel.

SUMMARY OF THE INVENTION

The present invention provides air vent means, preferably located in the ear muff region in the rear quarter panels on each side of the body near the rear window and roof, which comprises a baffle panel secured interiorly over the vent opening in the outside panel wall to form a plenum or separation chamber through which air is discharge and by which such water as may enter is separated from the air and drained away.

The baffle panel has a base flange which faces and is sealed against the inner surface of the outer wall and the baffle panel is secured to the outer wall by attachment means, preferably spot welds, which are located clear of the sealed baffle flange zone so as to avoid marring the exterior surface or welding in the flange sealing area and in position within the opening to be concealed from the outside by a louvered grill which covers the outside opening. The baffle panel is provided with open space at the top for the inflow of air from the body into the plenum, together with means to prevent the upflow of water to the top opening, and means at the bottom forming a sump pocket and drain for discharging entrapped water.

DRAWINGS

The objects, advantages, and features of novelty of the invention will be more apparent by reference to the accompanying drawings which illustrate exemplary embodiments of the invention and in which:

FIG. 1 is a side elevation of an automobile body having incorporated therein the air vent means of the present invention;

FIG. 2 is an enlarged view of the ear muff portion of a rear side quarter panel with the air vent means incorporated therewith;

FIG. 3 is a generally horizontal section taken on the line 3—3 of FIG. 2;

FIG. 4 is a perspective view of the pan-shaped baffle panel alone;

FIG. 5 is a generally vertical transverse section taken on the line 5—5 of FIG. 2;

FIG. 6 is a generally horizontal section taken on the line 6—6 of FIG. 2;

FIG. 7 is a view corresponding in location to FIG. 6 but showing a modified construction; and FIG. 8 is a view corresponding in location to FIG. 6 but showing another modified construction.

SPECIFIC DESCRIPTION

FIG. 1 shows the side of a vehicle body 10, often called the uniside except that a front fender panel (not shown) is often included in the uniside assembly and the front door 11 and the rear door 12 are usually left off until final assembly after painting and finishing or trimming. Although joints are not shown, there are a front side panel 13, a bottom side rail panel 14, a roof panel 15, a rear quarter panel 16 having an ear muff portion 17, and a rear fender panel 18, which in some cases may be considered to be a part of the rear quarter panel. The body air vent, which is generally designated by the numeral 20, with which the present invention is concerned, is located in the ear muff portion 17 of the rear quarter panel below the roof panel 15 and just forward of the rear window location denoted by the numeral 21.

The presently preferred form of the body air vent construction is shown in FIGS. 2 to 6.

The outer wall or outer quarter panel 25 is apertured in the ear muff area to provide one or more air vent openings 26. This may be regarded as one opening but preferably more than one separate opening will be provided so as to maintain the structure as strong and rigid as possible, leaving one or more division strips 27 and a plurality of horizontal edges 28 at the openings for the securement of louvered grill opening-covering means, locationally indicated at 29 in FIG. 6.

The vertical edges of the openings are provided with inturned angular flanges 30 to which there is secured, as by suitable fastening means, such as spot welds 31, a baffle plate 32 of pan shape which is disposed interiorly of the panel 25 over the openings 26. The baffle panel 32 is secured to the exterior panel 25 while it is accessible from both sides, as for use of a welding gun, and thereafter an interior quarter panel 33 is secured to the rear quarter panel 25 interiorily over the baffle panel 32, as at an inner welded flange joint 34 near the return 35 near the rear window opening 21 and by a door frame element 36.

The baffle panel 32 is generally hat-shaped in horizontal section, having a back plate 32a, sidewalls 32b, inclined flange elements 32c, and lateral flange elements 32d which lie in facing relationship to the wall inner face of the outer quarter panel 25. As best shown in FIGS. 3 and 6, the flange 32d on the side toward the door opening has a reversely turned flange 32e.

The baffle 32 is open at the top well above the top of the outer opening 26, as at 37, for the inflow of air from the body into the plenum, and is closed at the bottom well below the bottom of the outer opening 26, as at 38, to provide a sump or pocket for the collection of water which may get past the outer louvered openings 26. A drain opening 39 with suitable offtake means 40, such as piping or tubing leading to any convenient desired discharge location, is provided at the lowest point of the bottom pocket to drain all collected water without retained residue. The water run-off may be directly to the outside, as for window and roof gutters (note roof gutters 15a in FIG. 5) or may be carried out below or to the rear, as to the trunk gutter (not shown).

The baffle panel may also be provided near the top with one or more baffle slats 32f to prevent all chance of water being blown up through the top opening 37 by swirls or eddies of air.

Sealant 41, in the form of strip or coating is provided between the flanges 32d at the sides and bottom of the baffle panel 32 and the inside surface of the outer panel wall 25. By securing the baffle panel to the outer panel along the interior inclined flange portion 32c and the inclined flanges 30 of the outer panel wall, the need to make connections in the outer flanges 32d is avoided. This eliminates the need to weld through walls having sealant therebetween or to weld in a location where weld marks or blemishes would be visible exteriorly to require clean-up or leave visible blemishes in the final product.

Escaping air may be directed into the upper end 37 of the baffle plenum or separation chamber in various ways. In one form, as illustrated in FIG. 5, a rear transverse box header 45 opens at its ends into the upper space between the panels 25 and 33 and has openings 46 in its bottom wall for the inflow of vitiated air from inside the body. This is desirable for an outflow location because it is in the rear where all air is forced to flow and above passenger head space.

As shown in FIG. 6, the door frame member 36 which connects the outer and inner rear quarter panels 25 and 33 at overlapped inner joint 47 and overlapped outer joint 48 is provided with a return stiffening flange 49 to which the return flange 32e of the baffle panel 32 may be secured before the inner quarter panel 30 is installed.

In the modification shown in FIG. 7 the outer panel 25' is continued forward of the air vent 32' to form the rear door frame element 36', being connected to the inner panel 33' at the joint 47'. The flange 32e of FIG. 6 is omitted here, the parts otherwise being the same and designated by the same reference characters as in FIG. 6 but with a prime (') added.

The modification shown in FIG. 8 is like that of FIG. 7 except that the flange 32d" on one side is extended in a return flange 32e" which doubles along the door frame portion 36" to stiffen and strengthen the structure in this area. The parts otherwise are the same as in FIG. 7 and are designated by the same reference characters but with a double prime (") added.

From the above description it will be seen that air vents are provided at the ear muff regions of the body where they will be most effective for forced-through air circulation with least discomfort for passengers; that an air vent structure is provided which will effectively pass air outward and exclude water tending to blow inward, and also effectively separate such water as may enter the plenum formed by the baffle panel and drain it to the outside; also that a strong structure is maintained in the ear muff region and at the rear door opening in spite of having air vent openings provided in the outer quarter panels. The construction avoids all exterior weld marks or blemishes, avoids welding through sealant areas, and disposes welds interiorly of air vent openings where they will be concealed behind louvered opening-covering grids.

While certain embodiments of the invention have been described by way of illustration, it is to be understood that there may be various embodiments and modifications within the general scope of the invention.

I claim:
1. Air vent means, as for an enclosed automotive passenger vehicle having forced air circulation, comprising in combination, an outside body panel having an exterior air vent opening therein, an interior panel connected to the outside panel to form a hollow wall structural roof support therewith, a pan-shaped baffle panel having lateral flanges along the sides and bottom secured behind said opening and sealed at the lateral flanges to the inner surface of said outside panel at the sides and bottom of said opening to form a plenum behind the opening which is closed at the sides and bottom around the sides and bottom of the opening to convey air and such water as may enter the opening out of the plenum, said plenum being open at the top above the exterior opening to provide means for entry of air from within the vehicle and open at the bottom of said plenum to provide means for draining water therefrom.

2. Air vent means as set forth in claim 1, in which said outside panel is further provided with inclined inwardly directed attachment flanges overlapping adjacent portions of the baffle panel.

3. Air vent means as set forth in claim 1, in which said exterior air vent opening is divided by transverse strip means to form a plurality of sub openings and in which said attachment flanges are located separately in said sub openings.

4. Air vent means as set forth in claim 1, in which the connection between inner and outside body panels at the forward side is provided through a door frame element which at the rear edge is provided with a return flange, said baffle panel having a lateral flange on the sides and bottom, and the lateral flange on one side having a return flange element disposed alongside the return flange of said door frame element.

5. Air vent means as set forth in claim 1, in which the connection between the inner and outside body panels at the forward side is provided by forming a door frame element on said outside body panel and joining said door frame element to the inner panel at an interior joint.

6. Air vent means as set forth in claim 5, in which said baffle panel is provided on one side with flange means formed as a doubler with said door frame element.

References Cited

UNITED STATES PATENTS

| | | | |
|---|---|---|---|
| 3,059,561 | 10/1962 | Wilfert | 98—2 |
| 3,259,051 | 7/1966 | Boche | 98—2 |
| 3,357,338 | 12/1967 | Pollock | 98—2 |
| 3,406,622 | 10/1968 | Gotz | 98—2 |

MEYER PERLIN, Primary Examiner

U.S. Cl. X.R.

98—19